US007618906B2

(12) United States Patent
Meilahti

(10) Patent No.: US 7,618,906 B2
(45) Date of Patent: Nov. 17, 2009

(54) WINDOW MEMBRANE FOR DETECTOR AND ANALYSER DEVICES, AND A METHOD FOR MANUFACTURING A WINDOW MEMBRANE

(75) Inventor: Tomi Meilahti, Helsinki (FI)

(73) Assignee: Oxford Instruments Analytical Oy (FI)

( * ) Notice: Subject to any disclaimer, the term of this patent is extended or adjusted under 35 U.S.C. 154(b) by 241 days.

(21) Appl. No.: 11/281,638

(22) Filed: Nov. 17, 2005

(65) Prior Publication Data

US 2007/0111617 A1 May 17, 2007

(51) Int. Cl.

| | |
|---|---|
| ***D03D 9/00*** | (2006.01) |
| ***D03D 19/00*** | (2006.01) |
| ***B32B 3/30*** | (2006.01) |
| ***B32B 27/06*** | (2006.01) |
| ***B32B 27/12*** | (2006.01) |
| ***B05D 7/14*** | (2006.01) |
| ***H01J 5/18*** | (2006.01) |
| ***H01J 33/04*** | (2006.01) |
| ***H01J 35/18*** | (2006.01) |
| *H01J 5/02* | (2006.01) |
| *H01J 35/00* | (2006.01) |

(52) U.S. Cl. ............................... 442/16; 442/6; 442/19; 442/38; 442/41; 442/229; 442/236; 378/140; 378/161; 427/402; 427/409

(58) Field of Classification Search ..................... 442/6, 442/16, 38, 52, 31, 229, 286, 292
See application file for complete search history.

(56) References Cited

U.S. PATENT DOCUMENTS

| | | | | |
|---|---|---|---|---|
| 2,241,432 | A | 5/1941 | von Ardenne et al. | |
| 3,262,002 | A | 7/1966 | Kreplin | |
| 3,319,064 | A | 5/1967 | Guernet et al. | |
| 4,061,944 | A | 12/1977 | Gay | |
| 4,119,234 | A | 10/1978 | Lotschak et al. | |
| 5,039,203 | A | 8/1991 | Nishikawa | |
| 5,578,360 | A | 11/1996 | Viitanen | |
| 2002/0081921 | A1 * | 6/2002 | Vargo et al. | 442/16 |
| 2003/0142486 | A1 * | 7/2003 | Arakawa et al. | 361/818 |

OTHER PUBLICATIONS

Forbes R. Powell et al, "Metalized Polyimide Filters for X-ray Astronomy and other Applications", Grazing Incidence and Multilayer X-Ray Optical Systems, Richard Hoover and Arthur B.C. Walker, eds., Proceedings of SPIE, vol. 3113, 1997.*

X-ray windows for spaceborne detectors. Veli-Pekka Viitanen, Seppo A. A. Nenonen, Panu Partanen, Heikki Sipila, and Risto Mutikainen, Proc. SPIE 1743, 245 (1992), DOI:10.1117/12.130686.*

* cited by examiner

*Primary Examiner*—Jennifer A Chriss
(74) *Attorney, Agent, or Firm*—Wood Phillips Katz Clark & Mortimer

(57) ABSTRACT

A window membrane is permeable to electromagnetic radiation, especially soft X-rays. It comprises a film (201) and a metallic reinforcement mesh (202) attached to the film (201). A preferable way of attaching the metallic reinforcement mesh (202) to the film is to use a positive-working photosensitive glue (204) and allow the reinforcement mesh (202) to act as the exposure mask.

16 Claims, 3 Drawing Sheets

WINDOW MEMBRANE FOR DETECTOR AND ANALYSER DEVICES, AND A METHOD FOR MANUFACTURING A WINDOW MEMBRANE

TECHNICAL FIELD

The invention concerns generally the technology of reinforced membranes that have certain desired transmission characteristics of electromagnetic radiation. Especially the invention concerns a membrane that can be used as a window in X-ray detector and analyzer devices.

BACKGROUND OF THE INVENTION

The inside of an X-ray detector and/or analyzer appliance, or at least the inside of the component in which X-rays propagate, is often evacuated to a degree at which for practical purposes it constitutes a vacuum. A window in the wall of the vacuum container, through which the X-rays should pass, must fulfill contradictory requirements. On one hand it should attenuate the soft X-rays as little as possible, in order not to interfere with the measurement. On the other hand it must be mechanically strong enough to withstand the pressure difference.

In this description we use the term "film" to mean a thin material layer of uniform thickness, and the term "membrane" to mean generally a structure that is relatively thin, i.e. has a very small overall dimension in one direction compared to its dimensions in the other, perpendicular dimensions. A membrane may consist of several materials and may have significant local variations in its thickness, and may exhibit structural topology, such as reinforcement ridges.

FIG. 1 illustrates the cross section of a membrane structure for X-ray detector and analyzer devices known from the patent publication U.S. Pat. No. 5,039,203. The solid, continuous window film 101 is made of e.g. diamond, beryllium or a plastic like polyimide, which can be easily grown or spun into desired thickness on the flat surface of a specifically prepared substrate. The substrate may be e.g. a silicon wafer. During the manufacturing process the other surface of the substrate is patterned with a photoresist, and the gaps in the pattern are etched away to leave a grid of reinforcement bars that appear in the cross-section of FIG. 1 as blocks 102. In other words, the same material that appeared as the substrate during the manufacturing also appears as a reinforcement in the completed structure. Wider continuous sections 103 of the combined substrate and reinforcement material frequently remain at the edges of the window to make it easier to attach it into an attachment frame.

Another membrane structure is known from patent publication U.S. Pat. No. 5,578,360. In a cross section drawing it resembles that of FIG. 1, even if the manufacturing method and the whole structural approach are completely different. The starting point is again a window film 101 made of plastic like polyimide. However, the reinforcement grid is not made of the substrate material of the manufacturing time, but of a photosensitive polymer that is spread on top of the window film. Those parts of the photosensitive polymer that should remain as reinforcement bars are exposed to ultraviolet radiation, which causes them to polymerize and solidify, while the gap portions can be removed. Finally the combination of the window film and the reinforcement pattern is detached from the substrate material.

Other prior art publications that consider membrane structures and radiation-permeable windows are U.S. Pat. No.

4,119,234, U.S. Pat. No. 4,061,944, U.S. Pat. No. 3,319,064, U.S. Pat. No. 3,262,002, and U.S. Pat. No. 2,241,432.

A thin polyimide film as such lets through gas molecules too easily to be used as the sole constituent of the window film. A barrier treatment of e.g. ceramic nature is often used to decrease the unwanted diffusion of gases through the window membrane. Barrier deposition may also be used to block out unwanted visible light or other interfering bandwidths of the electromagnetic spectrum. However, the barrier treatments have only a negligible effect in the structural considerations that are involved in this description, and can therefore be mainly omitted by mentioning that a person skilled in the art would know to add the barrier(s).

There are certain drawbacks in the membrane structures that follow the principle of FIG. 1. Using silicon as the combined substrate and reinforcement material results in modest tolerance of changes in temperature. The thermal expansion coefficients of the materials of the window film 101 and the silicon reinforcement grid are typically so different that the lateral force resulting from different amounts of thermal expansion easily causes the window film to be peeled off, especially if polymer window films are used that otherwise would have many advantages over diamond.

We may also consider the characteristic dimensions designated as A, B, C and D in FIG. 1 and their effect to the applicability of the window. The thickness A of the window film is typically little less or little more than one micrometer, like 0.3-0.5 micrometers for polyimide and 4 micrometers for diamond. In U.S. Pat. No. 5,039,203 the thickness of the silicon substrate, which in the completed product appears as the thickness D of the reinforcement grid, is 200 micrometers. In the polymer-reinforced structure of U.S. Pat. No. 5,578,360 the polyimide grid is about 300 micrometers thick. The width B of the reinforcement bars varies from the 40-50 micrometer scale of the polymer reinforcement to the 600 micrometer width of the silicon laths in U.S. Pat. No. 5,039,203, and the gap width C is about 150 micrometers in the polymer-reinforced structures and several millimeters in U.S. Pat. No. 5,039,203.

If the gap width C becomes smaller than the reinforcement thickness D, the collimating effect of the reinforcement grid begins to grow disturbingly large. In other words, since the gaps between adjacent reinforcement bars begin to resemble an array of tiny, mutually parallel tubes, the window has better permeability to radiation coming at a right angle than to radiation that comes at an oblique angle. This is often an undesired characteristic. Making the gap width larger would diminish the collimating effect, but this requires also increasing the thickness of the window film, which in turn increases unwanted attenuation. Additionally a larger structural module of the reinforcement mesh makes the thermal expansion problems worse.

It is possible to decrease the reinforcement grid thickness if a separate mechanical support mesh made of a mechanically strong material like tungsten is placed in stack with the window membrane so that the last-mentioned may lean against the support mesh. However, such an arrangement has the inherent drawback that the support mesh only helps against a pressure difference in one direction. Should the direction of the pressure difference change e.g. due to the window being placed incorrectly or due to a pressure fluctuation during a manufacturing or servicing step, the window will burst immediately onto that side that does not have a support mesh. Using two support meshes, one on each side, would introduce too much attenuation, especially if the meshes were not perfectly aligned, which is difficult.

SUMMARY OF THE INVENTION

An objective of the present invention is to present a window membrane and a window member that has advantageous mechanical characteristics and isotropic permeability. Another objective of the invention is to present a window membrane and a window member that is widely applicable to different kinds of detector and analyzer devices. A yet another objective of the invention is to present a method for manufacturing the window membrane and the window member mentioned above in a way that has low unit cost and good yield.

The objectives of the invention are achieved by glueing a reinforcement mesh onto a window film using a positive-working photosensitive glue.

A window membrane according to the invention is characterized in that it comprises a film and a metallic reinforcement mesh attached onto one surface of the film.

A window member according to the invention is characterized in that it comprises a membrane in which a film and a metallic reinforcement mesh attached to the film form a composite structure, and an edge of said membrane for installing the window member gastightly to an opening in an X-ray detector or X-ray analyser device.

A method for manufacturing a window membrane according to the invention is characterized in that it comprises producing a film and attaching a metallic reinforcement mesh onto one surface of the film.

Materials such as tungsten that have good tensile strength do not need to be thick to make a mesh that can withstand considerable pressure in the direction perpendicular to the mesh. This property has been previously utilized in solutions where a complete window consists of a stack of a reinforced window membrane and a separate support mesh. The present invention introduces a composite structure, in which a reinforcement mesh is permanently attached to one surface of the window film. An advantageous material for attaching is a positive-working photosensitive glue, where "positive-working" means that unexposed parts solidify whereas exposed parts can be easily removed later in the process. Using a positive-working photosensitive glue is especially advantageous, because the reinforcement mesh can itself act also as an exposure mask.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
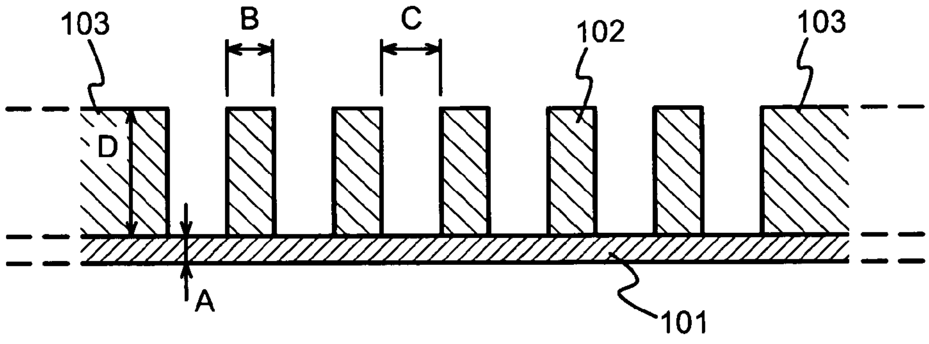
Fig. 1 PRIOR ART
FIG. 1 illustrates a prior art membrane structure.
Figure 2:
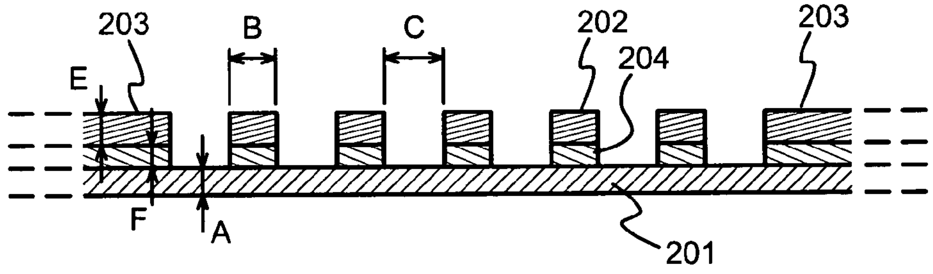
FIG. 2 illustrates a structural principle according to an embodiment of the invention.

FIG. 2 illustrates schematically a composite membrane structure according to a principal embodiment of the invention. The basic structural parts of the membrane are a continuous window film 201 and a reinforcement mesh 202. Since FIG. 2 is a cross-section drawing, only some portions of the reinforcement mesh are visible in the form of hatched rectangles. The reinforcement mesh may continue as extended solid portions 203 towards the edges of the window to facilitate more reliable fitting to a frame (not shown in FIG. 2). Between the reinforcement mesh 202 and the window film 201 there is a layer of solid material 204, which acts like a glue and attaches the reinforcement mesh 202 to the surface of the window film 201.

Figure 3:
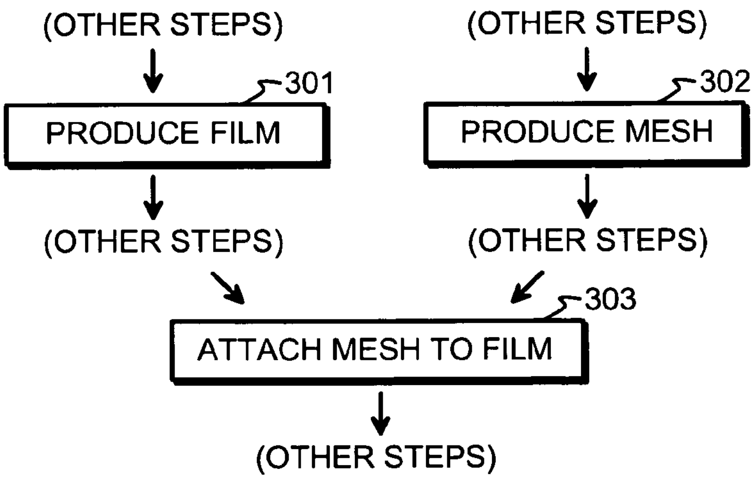
FIG. 3 illustrates some method steps according to an embodiment of the invention.

FIG. 3 illustrates an excerpt of a manufacturing process, in which at some previous manufacturing steps 301 and 302 there are formed a window film and a reinforcement mesh respectively. At some later step 303 in the process, the window film and the reinforcement mesh are attached together to form a composite structure. The manufacturing method may include other steps before steps 301 and 302 and after step 303, as well as between steps 301 and 302 and step 303.

Figure 4:
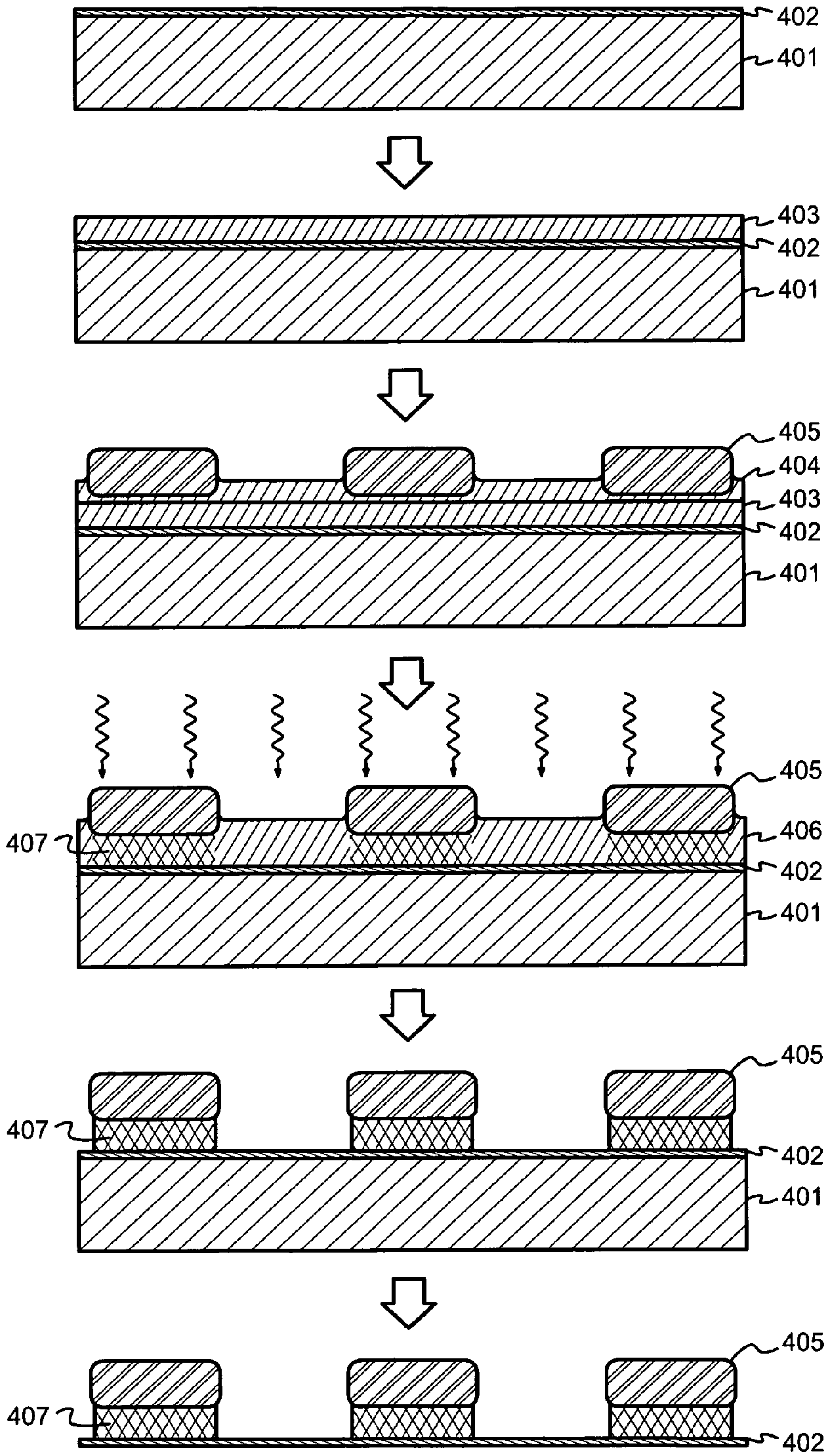
FIG. 4 illustrates manufacturing a window membrane according to an embodiment of the invention.

FIG. 4 is a step-by-step schematic illustration of the manufacturing of a window membrane according to an embodiment of the invention. We will omit any edge considerations and only consider what happens in a certain central section of a window membrane that is produced. A flat surface of a substrate 401, such as a silicon wafer, is first prepared for the manufacturing of polymer thin films on top of it just like in any known thin film manufacturing techniques. A polymer film 402 is produced on said surface for example by spinning a polymer solution into a desired uniform thickness and curing the polymer into solid form.

On top of the polymer film 402 there is formed another polymer layer 403 of a positive-working photosensitive polymer. Positive-working photosensitive polymers are materials that solidify slower if exposed to particular kind of radiation, typically ultraviolet radiation. Examples of positive-working photosensitive polyimide materials are the brands RN-901 and RN-902 of Nissan Chemical Industries Ltd; other varieties have been widely treated in standard literature of photochemistry. The polymer layer 403 is soft baked in order to facilitate easier handling in the subsequent step, but not fully cured.

Next, there is formed yet another polymer layer 404 on top of the previous polymer layer 403. Layer 404 consists also of a positive-working photosensitive polymer, and may well be of the same substance as layer 403. While the topmost layer 404 is still wet, a reinforcement mesh 405 is placed on top of it, with the obvious effect that the reinforcement mesh 405 at least partly sinks into the wet polymer solution of layer 404 or at least sticks to its surface. The reinforcement mesh 405 is made of material having high tensile strength; the question of dimensioning the mesh is considered in further detail later.

Since the lower positive-working polymer layer 403 was still not fully cured, we may assume that in practice it forms, together with the upper positive-working polymer layer 404, a combined layer 406. In the following step the layered structure is exposed to ultraviolet radiation coming from a normal direction of the plane of the substrate 401, and from that side on which the polymer layers and the reinforcement mesh have been placed. The radiation keeps the positive-working polymer of the combined layer 406 from solidifying on exposed areas, which are those coincident with holes in the reinforcement mesh 405. Directly under the wires of the reinforcement is shadow, so the cross-hatched regions 407 will solidify.

In a developing stage the exposed, unsolidified photosensitive polymer is removed, leaving just the reinforcement mesh 405 that is glued to the polymer film 402 by the solidified polymer regions 407. In order to complete the curing of these regions, the structure is subjected to hard baking. The composite membrane, which consists of the polymer film 402, solidified polymer regions 407 and the reinforcement mesh 405, is removed from the substrate 401 for example by wet etching. Before the application of any barrier treatments, the polymer film 402 is still relatively permeable to the molecules of the etching substance, which means that it is not necessary to etch out the whole substrate 401. It is sufficient to let some of the etching substance diffuse through the polymer film 402 to detach the composite membrane from the surface of the substrate 401. The lowest part of FIG. 4 shows the membrane detached from the substrate.

We may consider certain aspects of dimensioning the parts shown in FIG. 4. The thickness of the substrate 401 is of no importance. For example, if a silicon wafer is used as a substrate, it suffices to select a wafer that is readily available at reasonable cost, is applicable to the production of polymer thin films on its surface and lends itself well to handling in the process. The thickness of the cured polymer film 402 is typically in the order of some hundreds of nanometers, for example 300nm. It should be as thin as possible to minimize attenuation, but thick enough to stand the pressure difference across the regions that coincidence with holes in the reinforcement mesh.

The role of the first positive-working photosensitive polymer layer 403 is to protect the polymer film 402 during the manufacturing process, so that the edges of the mesh wires will not come into contact with the polymer film 402, and to add flexibility to the complete structure by ensuring that in each part of the structure there will be at least some additional polymer as a buffer between the polymer film 402 and the reinforcement mesh 405. In experiments it has been found that a suitable thickness of the first positive-working photosensitive polymer layer 403 could be in the order of a few micrometers, like 5 micrometers for example.

The role of the second positive-working photosensitive polymer layer 404 is to act as a glue. The layer should be thick enough to ensure complete wetting of the reinforcement mesh 405. Similarly with the first positive-working photosensitive polymer layer 403, the second positive-working photosensitive polymer layer 404 could be a few micrometers thick, like 5 micrometers for example. We assume that for a workable solution, the combined thickness of the first and second positive-working photosensitive polymer layers should be more than one micrometer and less than 25 micrometers.

The dimensioning and material of the reinforcement mesh 405 are selected to ensure sufficient tensile strength to withstand the pressure difference between atmospheric pressure and the very low pressure inside an X-ray detector or analyzer device. Another thing to consider is suitability for strong adhesive bonds with the photosensitive polymer in its cured form. If tungsten is used as the material of the reinforcement mesh, holes in the mesh constitute something like 70% of its surface area, and the overall window diameter is in the order of about one centimeter, the thickness of the reinforcement mesh 405 in the direction perpendicular to the plane of the mesh could be between 10 and 50 micrometers, typically 25 micrometers. The shape of the holes in the mesh does not have much importance to the invention, but conventionally they are circular, triangular or hexagonal. Hole diameter is typically in the order of a few micrometers. Known techniques exist for producing this kind of a mesh for example by electron beam lithography.

Figure 5:
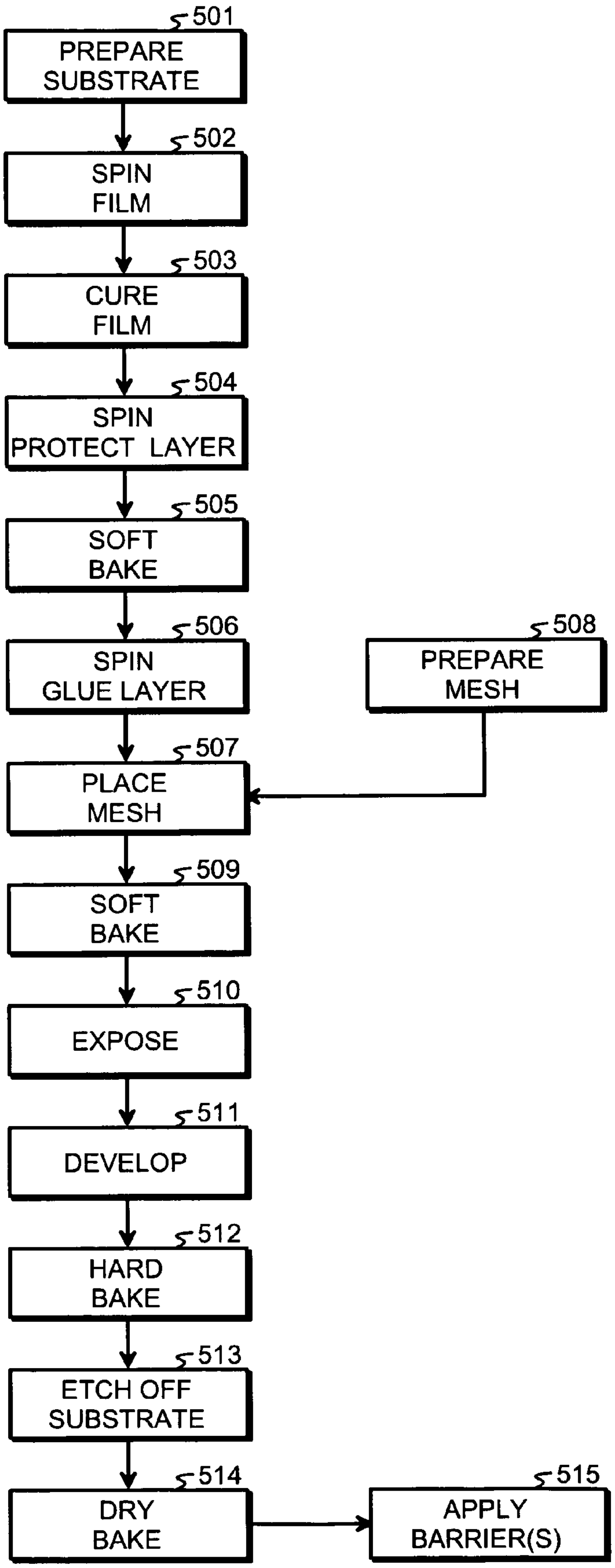
FIG. 5 illustrates a manufacturing method according to an embodiment of the invention.

A manufacturing method that has corresponding steps that were described above is illustrated stepwise in FIG. 5. Step 501 means preparing the substrate and step 502 means spinning the initial polymer layer that will constitute the window film onto the substrate. Step 503 is needed to cure the film so that its thickness, evenness and continuity will not be affected by the subsequent steps. Steps 504 and 505 mean applying and preliminarily solidifying the first positive-working photosensitive polymer layer. In step 506 the second positive-working photosensitive polymer layer is applied, and at step 507 the reinforcement mesh is dipped into it; a preparation step 508 of the reinforcement mesh is shown separately.

The soft baking step 509 makes the structure stabile enough for taking it to the exposure step 510, after which there follows developing at step 511 where the exposed portions of the positive-working photosensitive polymer are removed. Hard baking is made at step 512 and the membrane is etched off the substrate at step 513. Dry baking at step 514 dries off the etching substance. Gas and light barrier layers are applied according to known practice at step 515. Typically towards the end of the manufacturing process there are also steps like cutting the individual windows loose from a batch in which they were manufactured together, and attaching the window membrane to an installing frame.

The examples described above should not be construed as exclusive limitations. For example, other polymers than polyimide can be used, and the whole membrane does not need to consist of layers of the same basic polymer. Basically even the film material does not need to be a polymer, although polymers have significant advantages concerning e.g. easy handling in the manufacturing process. Tungsten is not the only possible material of the reinforcement mesh, but other materials, especially other metals, that have suitable tensile strength and other advantageous properties could be used as well. The mesh does not need to consist of one material only, but it may comprise e.g. an alloy of different metals or it may in turn consist of layers attached together previously in the manufacturing sub-process of the mesh. Instead of applying the protective layer and glue layer onto the polymer film and placing a dry mesh into the stack it may prove to be possible to pre-wet the mesh and apply it as such directly onto the film. It may also prove to be possible to omit the protective layer and use a glue layer only (i.e. to apply a glue layer onto a clean film and placing the mesh on top), if a suitable thickness, constitution and other parameters can be found for such a "standalone" glue layer.

The invention claimed is:

1. A window membrane permeable to electromagnetic radiation, comprising:

a film and a metallic reinforcement mesh attached onto one surface of the film, and a polymer layer between said film and said reinforcement mesh, said polymer layer attaching said film and said reinforcement mesh together;

wherein said polymer layer comprises a cured positive-working photosensitive polymer.

2. A window membrane according to claim 1, wherein the film is a polymer film.

3. A window membrane according to claim 2, wherein the polymer film comprises polyimide.

4. A window membrane according to claim 2, wherein the thickness of the polymer film is less than one micrometer.

5. A window membrane according to claim 1, wherein the metallic reinforcement mesh is made of tungsten.

6. A window membrane according to claim 5, wherein the thickness of the metallic reinforcement mesh is between 10 and 50 micrometers.

7. A window membrane according to claim 1, wherein the thickness of said polymer layer is between 1 and 25 micrometers.

8. A window member for use in at least one of X-ray detector and X-ray analyser devices, the window member comprising:

a membrane in which a film, a metallic reinforcement mesh and a polymer layer between said film and said reinforcement mesh form a composite structure, in which said polymer layer attaches said reinforcement layer to said film and in which said polymer layer comprises a cured positive-working photosensitive polymer, and an edge of said membrane for installing the window member gas tightly to an opening in an X-ray detector or X-ray analyser device.

9. A method for making a window membrane that is permeable to electromagnetic radiation, comprising:

producing a film, applying at least one layer of polymer solution comprising a positive-working photosensitive polymer onto a surface of the film, placing a metallic reinforcement mesh into an applied layer of polymer solution while that applied layer of polymer solution is still wet, allowing the at least one applied layer of polymer solution to at least partly solidify, thus producing an at least partly solidified polymer layer that attaches said metallic reinforcement mesh to said film.

10. A method according to claim 9, wherein the step of producing a film comprises applying a layer of a polymer solution onto a substrate and allowing said layer of a polymer solution to solidify, thus producing a polymer film.

11. A method according to claim 9, comprising:

after allowing the at least one applied layer of polymer solution to at least partly solidify, removing parts of the at least partly solidified polymer layer that coincide with holes in the metallic reinforcement mesh.

12. A method according to claim 11, wherein removing parts of the at least partly solidified polymer layer comprises:

exposing the at least partly solidified polymer layer to radiation through the metallic reinforcement mesh and developing the positive-working photosensitive polymer.

13. A method according to claim 9, wherein the step of applying at least one layer of polymer solution onto the surface of the film comprises applying a first layer of a positive-working photosensitive polymer solution onto the surface of the film, allowing the applied first layer to partly solidify, and applying a second layer of a positive-working photosensitive polymer solution onto the partly solidified first layer; and wherein the step of placing the metallic reinforcement mesh into an applied layer of polymer solution involves placing the metallic reinforcement mesh into the second layer while the second layer is still wet.

14. A method according to claim 9, wherein the step of producing the film comprises producing the film onto a substrate, and the method comprises, after attaching the metallic reinforcement mesh onto the surface of the film, removing the combined structure of the film and the metallic reinforcement mesh from the substrate.

15. A method according to claim 14, wherein the substrate is made of silicon, and removing the combined structure of the film and the metallic reinforcement mesh from the substrate comprises wet etching, in which an etching substance is allowed to diffuse through the film to detach the film from the substrate.

16. A method according to claim 15, additionally comprising:

applying a barrier treatment to the window membrane after removing it from the substrate.

* * * * *

UNITED STATES PATENT AND TRADEMARK OFFICE

CERTIFICATE OF CORRECTION

PATENT NO. : 7,618,906 B2
APPLICATION NO. : 11/281638
DATED : November 17, 2009
INVENTOR(S) : Tomi Meilahti It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 431 days.

Signed and Sealed this

Twenty-sixth Day of October, 2010

David J. Kappos

*Director of the United States Patent and Trademark Office*